United States Patent
Liu et al.

(10) Patent No.: US 9,442,910 B2
(45) Date of Patent: Sep. 13, 2016

(54) METHOD AND SYSTEM FOR ADDING PUNCTUATION TO VOICE FILES

(71) Applicant: Tencent Technology (Shenzhen) Co., Ltd., Shenzhen, Guangdong (CN)

(72) Inventors: Haibo Liu, Shenzhen (CN); Eryu Wang, Shenzhen (CN); Xiang Zhang, Shenzhen (CN); Li Lu, Shenzhen (CN); Shuai Yue, Shenzhen (CN); Bo Chen, Shenzhen (CN); Lou Li, Shenzhen (CN); Jian Liu, Shenzhen (CN)

(73) Assignee: Tencent Technology (Shenzhen) Co., Ltd., Guangdong (CN)

( * ) Notice: Subject to any disclaimer, the term of this patent is extended or adjusted under 35 U.S.C. 154(b) by 318 days.

(21) Appl. No.: 14/219,704

(22) Filed: Mar. 19, 2014

(65) Prior Publication Data

US 2014/0350918 A1 Nov. 27, 2014

Related U.S. Application Data

(63) Continuation of application No. PCT/CN2013/087826, filed on Nov. 26, 2013.

(30) Foreign Application Priority Data

May 24, 2013 (CN) .......................... 2013 1 0196391

(51) Int. Cl.
| | |
|---|---|
| *G06F 17/20* | (2006.01) |
| *G06F 17/27* | (2006.01) |
| *G10L 15/00* | (2013.01) |
| *G06F 17/24* | (2006.01) |
| *G10L 15/04* | (2013.01) |

(52) U.S. Cl.
CPC ........... *G06F 17/24* (2013.01); *G06F 17/2785* (2013.01); *G10L 15/04* (2013.01)

(58) Field of Classification Search
CPC ... G10L 15/18; G10L 15/1822; G10L 15/26; G06F 17/20; G06F 17/21; G06F 17/211; G06F 17/24; G06F 17/27; G06F 17/2705; G06F 17/2785

USPC ................................................ 704/1, 9, 257
See application file for complete search history.

(56) References Cited

U.S. PATENT DOCUMENTS

| | | | | |
|---|---|---|---|---|
| 6,067,514 A | * | 5/2000 | Chen | 704/235 |
| 6,175,820 B1 | * | 1/2001 | Dietz | 704/235 |

(Continued)

FOREIGN PATENT DOCUMENTS

| | | |
|---|---|---|
| CN | 1235312 A | 11/1999 |
| CN | 102231278 | 11/2011 |

(Continued)

OTHER PUBLICATIONS

Beeferman, Doug, Adam Berger, and John Lafferty. "Cyberpunc: A lightweight punctuation annotation system for speech." Acoustics, Speech and Signal Processing, 1998. Proceedings of the 1998 IEEE International Conference on. vol. 2. IEEE, 1998.*

(Continued)

*Primary Examiner* — Paras D Shah
(74) *Attorney, Agent, or Firm* — Brinks Gilson & Lione

(57) ABSTRACT

A method and system for adding punctuation to a voice file is disclosed. The method includes: utilizing silence or pause duration detection to divide a voice file into a plurality of speech segments for processing, the voice file includes a plurality of features units; identifying all features units that appear in the voice file according to every term or expression and semantics features of the every term or expression that form each of the plurality of speech segments; using a linguistic model to determine a sum of weight of various punctuation modes in the voice file according to all the feature units, the linguistic model is built upon semantics features of various parsed out terms or expressions from a body text of a spoken sentence according to a language library; and adding punctuations to the voice file based on the determined sum of weight of the various punctuation modes.

18 Claims, 4 Drawing Sheets

(56) References Cited

U.S. PATENT DOCUMENTS

| | | | |
|---|---|---|---|
| 6,321,197 B1 | 11/2001 | Kushner et al. | |
| 8,260,619 B1* | 9/2012 | Bansal et al. | 704/275 |
| 8,612,204 B1 | 12/2013 | Uszkoreit et al. | |
| 8,918,317 B2* | 12/2014 | Fritsch et al. | 704/235 |
| 2002/0069055 A1* | 6/2002 | Tang et al. | 704/235 |
| 2002/0156627 A1* | 10/2002 | Itoh et al. | 704/254 |
| 2004/0138881 A1* | 7/2004 | Divay et al. | 704/231 |
| 2010/0121638 A1* | 5/2010 | Pinson et al. | 704/235 |
| 2010/0292989 A1 | 11/2010 | Kitade et al. | |
| 2011/0010175 A1* | 1/2011 | Kitade et al. | 704/254 |
| 2011/0112837 A1* | 5/2011 | Kurki-Suonio et al. | 704/235 |
| 2011/0288863 A1* | 11/2011 | Rasmussen | 704/235 |
| 2013/0325442 A1* | 12/2013 | Dahlmeier | G06F 17/276 704/9 |

FOREIGN PATENT DOCUMENTS

| | | |
|---|---|---|
| CN | 102231278 A | 11/2011 |
| JP | 2001134289 A | 5/2001 |

OTHER PUBLICATIONS

Huang, Jing, and Geoffrey Zweig. "Maximum entropy model for punctuation annotation from speech." Interspeech. 2002.*

Kolář, J., J. Švec, and Josef Psutka. "Automatic punctuation annotation in Czech broadcast news speech." SPECOM' 2004.*

Christensen, Heidi, Yoshihiko Gotoh, and Steve Renals. "Punctuation annotation using statistical prosody models." ISCA Tutorial and Research Workshop (ITRW) on Prosody in Speech Recognition and Understanding. 2001.*

Kim, Ji-Hwan, and Philip C. Woodland. "The use of prosody in a combined system for punctuation generation and speech recognition." Interspeech. 2001.*

Gravano, Agustin, Martin Jansche, and Michiel Bacchiani. "Restoring punctuation and capitalization in transcribed speech." 2009 IEEE International Conference on Acoustics, Speech and Signal Processing. IEEE, 2009.*

International Preliminary Report on Patentability and Written Opinion received in PCT Application No. PCT/CN2013/087826 dated Nov. 24, 2015.

Office Action dated Mar. 21, 2016 received in co-pending U.S. Appl. No. 14/160,808.

Office Action dated Feb. 26, 2016 received in co-pending U.S. Appl. No. 14/148,579.

Office Action dated Jul. 16, 2015 for corresponding Chinese Patent Application No. 201310196391.4, 5 pages.

International Search Report and Written Opinion dated Feb. 27, 2014 received in related PCT Application No. PCT/CN2013/087826.

* cited by examiner

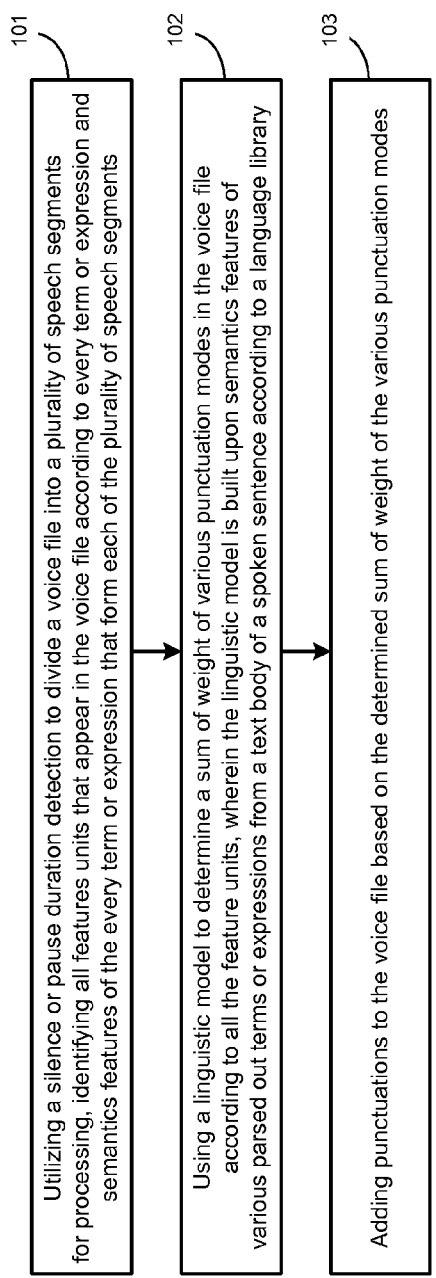
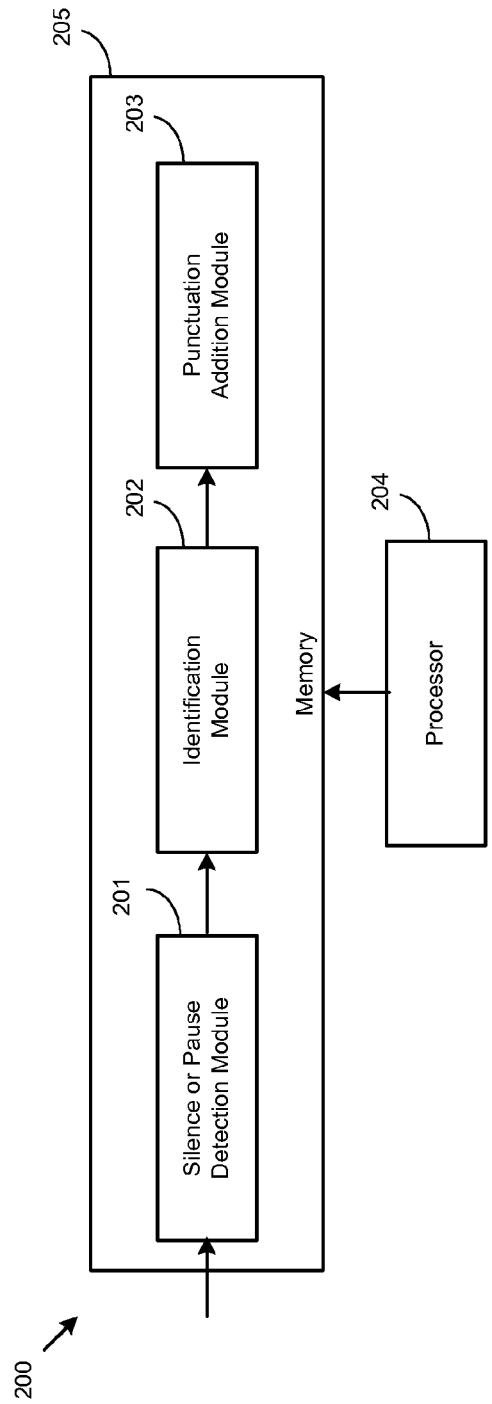

METHOD AND SYSTEM FOR ADDING PUNCTUATION TO VOICE FILES

CROSS-REFERENCE TO RELATED APPLICATIONS

This application is a continuation of PCT Application No. PCT/CN2013/087826, filed on Nov. 26, 2013, which claims priority to Chinese Patent Application No. 2013101963914, filed on May 24, 2013, which is incorporated by reference in their entireties.

FIELD OF THE TECHNOLOGY

The present disclosure relates generally to the field of information processing technology and, more particularly, to a method and system for adding punctuation to a voice file.

BACKGROUND

In the fields of communication and Internet application, it is necessary under certain application scenarios to add punctuation to some files with a lack of punctuation, e.g. adding punctuation for voice files. Such adding punctuation for voice files may find many applications in speech to text conversion technology, which a speaker may dictate his speech accurately on a transcript. Applications may be found from the court room testimony transcription to the class room, which a student may record the teacher's lecture and have them transcribed into text for study, to aid people with hearing problem to read what has been spoken, and using voice to command on-line transactions, to name a few.

With regard to adding punctuation for voice files, at present there exists a scheme for adding punctuation based on parsing out each word or character (or word parsing) within a sentence for processing and the determining a location of each word.

More specifically, the word parsing method is performed on known sentences stored in advance in a text library (such as a database) and to determine the word's relative location within the sentence (i.e. at the beginning, middle or end of the sentence). There is a determination of whether or not there is a punctuation used after the word in the sentence, if so, what is the punctuation mode (i.e., what type of punctuation is used with it). Accordingly, a linguistic model may be built based on the how each word is placed within a relative location of a sentence and its punctuation mode (if any) after the word.

Therefore, the prior art method requires taking the whole voice file to parse out every word or character and match the character location to each sentence, then add punctuations according to the linguistic model based on the individual word location to known sentences and a correct arrangement of the words within the sentence. This process may be time consuming, lack of intuition, and may not reflect an accurate translation or true meaning to the sentence after adding punctuations.

In addition, the linguistic model built using the location of individual word or character in the sentence, or the presence or absence of punctuation after the single word or character may be limited in relevance and may not be able to extract an actual relationship between the information contained in the sentence and the punctuation mode. Also, simply taking a voice file to be processed as a whole for the addition of punctuation fails to consider the internal structural features of the voice file to be processed. Consequently, the accuracy in adding punctuation to voice files is still quite low at present.

SUMMARY

The present disclosure provides a method and system for accurately adding punctuation to a voice file. The method includes: utilizing silence or pause duration detection to divide a voice file into a plurality of speech segments for processing, wherein the voice file comprises a plurality of features units; identifying all features units that appear in the voice file according to every term or expression and semantics features of the every term or expression that form each of the plurality of speech segments; using a linguistic model to determine a sum of weight of various punctuation modes in the voice file according to all the feature units, wherein the linguistic model is built upon semantics features of various parsed out terms or expressions from a body text of a spoken sentence according to a linguistic library; and adding punctuations to the voice file based on the determined sum of weight of the various punctuation modes.

A system for adding punctuation to a voice file, includes: at least a processor working in conjunction with a memory and a plurality of modules, wherein the modules include at least: a silence or pause duration detection module, an identification module and a punctuation addition module, wherein: the silence or pause duration detection module divides a voice file to be processed into a plurality of speech segments to be processed based on silence or pause duration detection; the identification module identifies all features units that appear in the voice file according to every term or expression and semantics features of the every term or expression that form each of the plurality of speech segments; the punctuation addition module uses a linguistic model to determine a sum of weight of various punctuation modes in the voice file according to all the feature units, wherein the linguistic model is built upon semantics features of various parsed out terms or expressions from a body text of a spoken sentence according to a linguistic library; and adding punctuations to the voice file based on the determined sum of weight of the various punctuation modes.

As seen, the present disclosure in adding punctuation to a voice file, differs from the prior art method at least on: (1) identifying speech segments from a voice file (instead of using the whole voice file); (2) identifying terms and expression (versus individual word in the prior art) with complete meaning; (3) analyze the semantic features (versus the prior art which does not use semantics features) of every term or expression and expression to extract the attributes and to construct the terms and expressions as components of a sentence; and (4) analyze the location of the term and expression based on the semantics features; (5) determining a sum of weight of various punctuation modes in the voice file according to all the feature units, wherein the linguistic model is built upon semantics features of various terms or expressions parsed from a body text of a spoken sentence according to a linguistic library; and (6) adding punctuations at the appropriate location of the voice file or spoken sentence based on the determined sum of weight of the various punctuation modes.

Consequently, punctuations when added at the correct location may provide an accurate meaning to the sentence and may convey the proper mood of the speaker.

With the above examples and explanations in mind, the following paragraphs describe the embodiments of the invention with further details.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

FIG. 1 is an exemplary process flow diagram illustrating a method for adding punctuations to a voice file, according to an embodiment of the present disclosure.

FIG. 2 is an exemplary schematic block diagram depicting a system for adding punctuations to a voice file, according to an embodiment of the present disclosure.

DETAILED DESCRIPTION OF THE EMBODIMENTS

Figure 3:
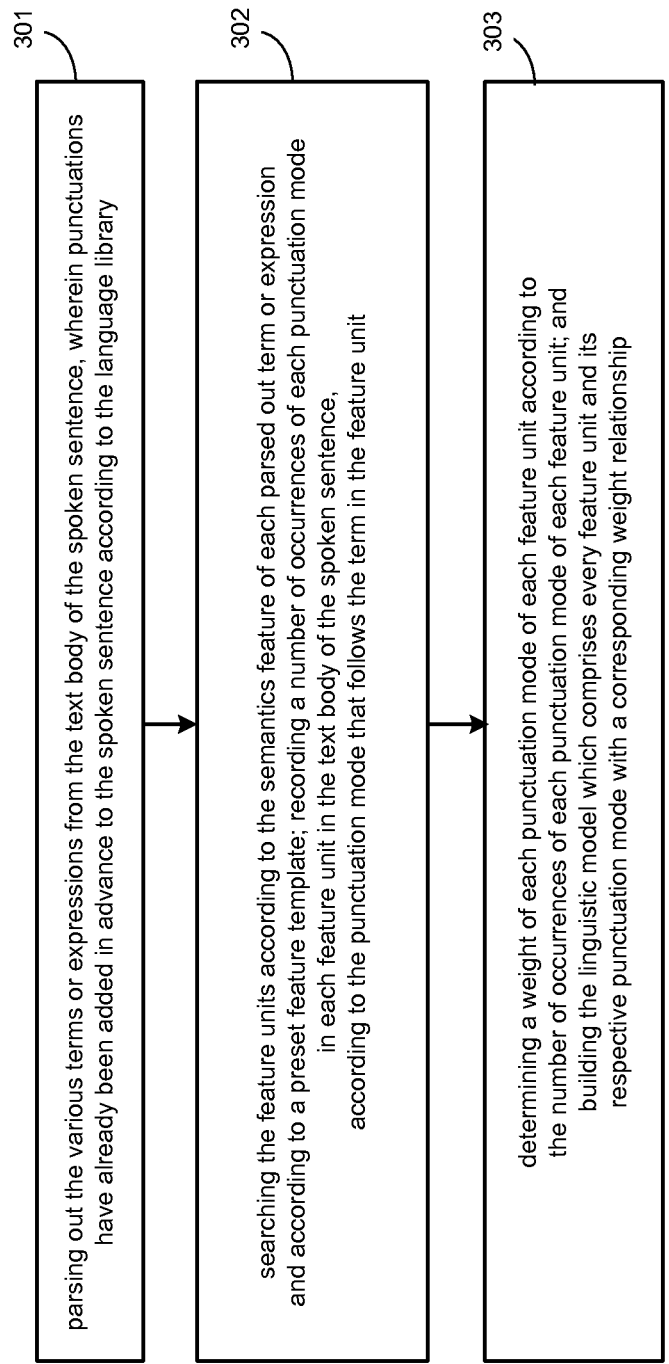
FIG. 3 is an exemplary first process flow diagram illustrating a method for building a linguistic model used for adding punctuations to a voice file, according to an embodiment of the present disclosure.

The various embodiments of the present disclosure are further described in details in combination with attached drawings and embodiments below. It should be understood that the specific embodiments described here are used only to explain the present disclosure, and are not used to limit the present disclosure.

In effect, the embodiments of the invention presented accomplish an analysis of both a structure of each sentence (by dividing a voice file into a plurality of speech segments) and the semantics features which are embedded in each term or expressions (which have been parsed out from the speech segments according to a linguistic model) before establishing if any punctuation should be added, if so, what mode of punctuation should be used. More specifically, the division of a voice file into a plurality of speech segments is accomplished by silence or pause duration detection.

For the sake of understanding, below is a brief definition of the terminologies which may be used throughout the description to provide general understanding. They do not represent authoritative definitions. If there is any conflict in the meaning with the ordinary meaning from a dictionary, the following definitions may take precedence.

A voice file may be one of: a single word or a group of words to complete a speech. If a group of words, it may be a term, an expression, a phrase, a short single sentence, a long single sentence or may be multiple sentences with a combination of both short sentences and long sentences, which is spoken and converted into a voice file. An example of a voice file may look like this one: "Today the weather is nice this afternoon let's go to ball game and afterwards let's go to dinner".

A speech segment is a portion of a voice file, which may be separated by a silence or pause duration. Using the example given above, depending on where the pause duration is detected when a speaker speaks, the voice file may be divided into three speech segments, such as: "today the weather is nice", "this afternoon let's go to ballgame", "and afterwards let's go to dinner". The voice file may be detected to have only two speech segments, such as: "today the weather is nice", "this afternoon let's go to ball game and afterwards let's go to dinner". Alternately, a speaker may speak slowly and the voice file may be detected to have four speech segments: "today the weather is nice", "this afternoon let's go to ballgame", "and afterwards", "let's go to dinner".

A term or expression may be formed by a single word or formed by multiple words such as a phrase which conveys an understandable meaning. Using the example above, the terms or expressions which may be parsed out from the body text of the spoken sentence may include: "today", "the weather", "is nice", "this afternoon", "let's go", "to a ballgame", "and", "afterwards", "dinner".

Semantic features of a term or expression may include "word attribute or property", and "composition" within the sentence. Some examples of "word attribute or property" may include a noun, a pronoun, an adjective, a verb, an adverb, etc. Some examples of "composition" may include an adverbial modifier, a subject, an object, a predicate, etc.

Using the example given above: the semantic feature of the term or expression "today" is a noun, and it may function as an "adverbial modifier" component within the spoken sentence. Likewise, "the weather" is a noun and it may function as a "subject" component; "is nice" is an adjective and it may function as a "predicate" component; "let's" may be a pronoun and it may function as a "subject" component; "this afternoon" is a noun and it may function as an "adverbial modifier"; "go" is a verb and it may function as a "predicate" component; "ballgame" and "dinner" are nouns and may function as "object" components; and "afterwards" is an adverb and it may function as a "predicate" component.

Punctuation modes are punctuation types (if any) that is used after each term or expression in the spoken sentence. Examples of punctuations are comma ",", period ".", question mark "?", exclamations "!", to name a few.

Using the example given above: the punctuation mode after the terms or expressions: "today", "the weather", "let's", "this afternoon", "go", "afterwards" is none or no punctuation should be used. The punctuation mode after the terms or expressions "is nice" and "ballgame" may be a comma "," (if not located at the end of the sentence). The punctuation mode after the term or expression "dinner" may be a period "." or an exclamation mark "!" (if located at the end of the sentence), depending on the semantics meaning or the intonation of the speech segment.

Using the information of the number of speech segments, the semantic features of the analyzed terms or expressions, and the various punctuation modes to be added after the analyzed terms or expressions, a voice file with punctuations may be constructed.

Using the example given above, if the voice file has been divided into three speech segments with normal tone, the voice file may look like: "Today the weather is nice, this afternoon let's go to ballgame, and afterwards let's go to dinner."

If the voice file has been divided into two speech segments with voice emphasis on "nice" and a longer pause after "nice" before starting the next speech segment, the voice file may look like: "Today the weather is nice! This afternoon let's go to ballgame and afterwards let's go to dinner."

If the voice file has been divided into four speech segments with a longer pause after "nice" before starting the next speech segment, the voice file may look like: "Today the weather is nice. This afternoon let's go to ballgame, and afterwards, let's go to dinner".

Alternately, a speaker may speak at a slow pace to cause the voice file to be divided into four speech segments as above (i.e., with a longer pause between "afterwards" and "let's go to dinner"), however, a determination of a sum of weight of punctuation mode to the voice file may still indicate that no punctuation should be added at the pause duration between "afterwards" and "let's go to dinner". In this regard, the voice file after punctuations added may still appear to have only three speech segments, which may look like: "Today the weather is nice. This afternoon let's go to ballgame, and afterwards let's go to dinner".

The following detail description of the various embodiments may provide better appreciation of the disclosure.

FIG. 1 is an exemplary process flow diagram illustrating a method for adding punctuations to a voice file, according to an embodiment of the present disclosure.

Step 101: utilizing a silence or pause duration detection to divide a voice file into a plurality of speech segments for processing, identifying all features units that appear in the voice file according to every term or expression and semantics features of the every term or expression that form each of the plurality of speech segments.

The voice file may include a plurality of features units. The semantic features of a term or expression may include "word attribute or property", and "composition" within the sentence. Some examples of "word attribute or property" may include a noun, a pronoun, an adjective, a verb, an adverb, etc. Some examples of "composition" may include an adverbial modifier, a subject, an object, a predicate, etc. The same term or expression may or may not have the same word attribute or component, depending on the context of the term or expression.

Step 102: using a linguistic model to determine a sum of weight of various punctuation modes in the voice file according to all feature units, wherein the linguistic model is built upon semantics features of various parsed out terms or expressions from a body text of a spoken sentence according to a linguistic library.

Various punctuation modes may correspond to a respective weight when associated with a respective feature unit belonging to the term or expression when being acquired from the linguistic model. The corresponding weight of the punctuation mode may be used in determining the sum of weight of the various punctuation modes of the term or expression in the voice file, Step 103: adding punctuation to the voice file based on the determined sum of weight of the various punctuation modes. In this step, punctuations may be added to the voice file to be processed only according to the sum of weight, i.e. determining the punctuation modes of the voice file corresponding to the maximum sum of weight as the ultimate punctuation modes of the voice file. The sum of weight may be taken as a reference factor to be considered along with other reference factors for adding punctuations to the voice file to be processed.

It may be seen from the embodiment shown in FIG. 1 that, the present disclosure takes into consideration the semantic features of each term or expression in the voice file to be processed, and obtains the sum of weight according to the feature units appearing in the voice file for adding punctuation thereto. The internal structural features of the voice file to be processed, however, may influence or affect the semantic features and the feature units also. For example, a noun or pronoun that occurs at the beginning of a sentence may function as a "subject" in a composition of a spoken sentence. A noun or pronoun that occurs at the end of a sentence may function as an "object" in a composition of the spoken sentence.

Therefore, in determining semantic features and extracting feature units, the method as illustrated in FIG. 1 may take into consideration the effects of the internal structural features of the voice file on the punctuation modes, by first dividing the voice file into a plurality of speech segments to be processed based on silence or pause duration detection. Speech segmentation may help accurately characterizing or analyzing the semantic features of the terms or expressions by extracting the feature units, thereby improving the accuracy of the determination of the sum of weight before adding punctuations to the voice file.

The sum of weight of the punctuation modes of a voice file may be determined prior to the addition of punctuations to the voice file. For example, if a silence interval or duration between term or expression 1 and term or expression 2 is greater than a preset duration threshold, however, the maximum sum of weight corresponding to the punctuation mode of the voice file may instead indicate that no punctuation should be added after the term or expression 1. If so, then no punctuation would be added after the term or expression 1 during the process of punctuation adding to the voice file. In this regard, such sum of weight determination may help to avoid mistakenly adding punctuations caused by very slow speech pace.

Accordingly, punctuation should be added at least based on detecting for a proper silence or pause duration, as well as based on a determination of a sum of weight corresponding to the punctuation mode of the voice file. This may be illustrated by the example already described in the summary section above, that a speaker may speak at a slow pace to cause the voice file to be divided into four speech segments based on silence or pause duration detection, namely, "today the weather is nice", "this afternoon let's go to ballgame", "and afterwards", "let's go to dinner". However, a determination of a sum of weight of punctuation mode to the voice file may indicate that no punctuation should be added at the pause duration between "afterwards" and "let's go to dinner". In this regard, the voice file after punctuations added may appear to have only three speech segments, and may look like: "Today the weather is nice. This afternoon let's go to ballgame, and afterwards let's go to dinner".

In the detection of silence or pause duration, different silence or pause duration thresholds may be preset for different application scenarios. For example, when adding punctuations for voice in a map-based application scenario, voice input of geographical place names often involve short pauses due to unfamiliar names or lengthy place names. Therefore, a longer silence or pause duration threshold may be set for the map-based application scenario to void adding punctuations within a complete place name.

The identifying all feature units appearing in the voice file to be processed according to every term or expression and semantics features of the every term or expression may be illustrated with the example given above in the summary discussion. The sentence "Today the weather is nice. This afternoon let's go to ballgame, and afterwards let's go to dinner" may be divided into three speech segments, namely, the first speech segment: "Today the weather is nice" may include feature unit (n1); the second speech segment: "This afternoon let's go to ballgame" may include feature unit (n2); and the third speech segment: "and afterwards let's go to dinner" may include feature unit (n3).

All feature units (n1, n2, n3) contained may be based on each term or expression and the semantic features of the term or expression contained in the three speech segments. A gathered set (N) of all the feature units (n1, n2 and n3) may be determined.

FIG. 2 is an exemplary schematic block diagram depicting a system for adding punctuations to a voice file, according to an embodiment of the present disclosure. The system (200) includes at least a processor (204) working in conjunction with a memory (205) and a plurality of modules.

The plurality of modules may include at least a silence or pause duration detection module (201), an identification module (202) and a punctuation addition module (203). The plurality of modules may be implemented as a combination of hardware and software. If implemented as software, the modules may be different sections of program codes stored in a non-transitory media, such as the memory (205). The memory (205) may be a ROM, a flash memory, a DRAM, disk drive or a CD ROM.

The silence or pause duration detection module (201) divides a voice file to be processed into a plurality of speech segments to be processed based on silence or pause duration detection. The identification module (202) identifies the entire feature units appearing in the voice file to be processed according to every term or expression, and a semantic feature of the every term or expression that form each of the plurality of speech segments. The punctuation addition module (203) uses a linguistic model to determine a sum of weight of various punctuation modes in the voice file according to all the feature units, wherein the linguistic model is built upon semantics features of various parsed out terms or expressions from a body text of a spoken sentence according to a language library; and adding punctuations to the voice file based on the determined sum of weight of the various punctuation modes.

More specifically, the silence or pause duration detection module (201) performs: determining a silence or pause duration threshold according to a current application scenario, detecting the silence or pause duration in the voice file to be processed, and when the silence duration is longer than the silence threshold: and separating the voice segments to be processed in the voice file at a location that corresponds to the silence or pause duration.

The identification module (202) performs: identifying the feature unit that appears in each of the plurality of speech segments to be processed; and gathering into a set, the feature units that appear in the plurality of speech segments to form the all the feature units.

The punctuation addition module (203) performs: acquiring from the linguistic model corresponding relationships between each feature unit among all the feature units and the weights of the respective various punctuation modes; determining the weight of the punctuation mode of each term or expression in the voice file to be processed according to the acquired corresponding relationships, and determining the sum of weight of the various punctuation modes of the voice file to be processed according to the weight of the punctuation mode of each term or expression.

In the system (200) for adding punctuation provided by the present disclosure, the various modules (201-203) may be re-compartmentalized or detailed according to actual needs.

For example, the identification module (202) may include a semantic feature identification element and a feature extraction element, the semantic feature identification element may be used for identifying each term or expression in the speech segments to be processed and the semantic features thereof, the feature extraction element may be used for determining all feature units appearing in the voice file to be processed according to a preset feature template and each term or expression contained in the voice file, and the semantic features thereof.

For example, the punctuation addition module (203) may include a weight acquisition element and sum of weight computation element, the weight acquisition element may be used for acquiring corresponding relationships between each feature unit of the voice file and the weights of its respective various punctuation modes.

The sum of weight computation element may be used for determining the weight of the punctuation mode of each feature unit in the voice file according to the corresponding relationships acquired by the weight acquisition element and computing the sum of weight of various punctuation modes of the voice file according to the weight of the punctuation mode of each feature unit.

In the method and system for adding punctuations to the voice file, the weight of the punctuation mode of each term or expression in a voice file may be determined according to the corresponding relationships between the acquired feature unit and the weight of its respective various punctuation modes. Specifically, the weight of the punctuation mode of each term or expression in a voice file may be determined using a number of methods which are not limited to any particular embodiment of the present disclosure.

For example, the weight of the punctuation mode of each term or expression in a voice file may be determined using function mapping method, and according to corresponding relationships. Specifically, for a term or expression at a current location in a voice file, all feature units containing the term or expression at the current location are determined. The corresponding relationships between each feature unit of the term or expression at the current location and the weights of its respective various punctuation modes are acquired, and the weights of various punctuation modes of the term or expression at the current location may be determined according to a preset mapping function. Wherein, different occurrences of a term or expression of the same content at different locations in a voice file to be processed may be equivalent to different terms or expressions, the feature units at their locations and their punctuation statuses are also different.

The punctuation modes of a voice file to be processed include the punctuation mode of each term or expression in the voice file, which is equivalent to a combination of the punctuation statuses of all words in the voice file to be processed, therefore the sum of weight of various punctuation modes of the voice file may be determined using an optimal path algorithm, such as determining the optimal combination mode of the punctuation statuses of all words, terms or expressions in the voice file using the Viterbi algorithm (i.e. determining the optimal path), where the sum of weight of the optimal combination mode is the highest.

The linguistic model of an embodiment of the present disclosure is a linguistic model built based on speech segmentation and semantic features of terms and expressions including corresponding relationships between each feature unit and the weights of its respective various punctuation modes. The linguistic model is able to provide corresponding relationships between a respective feature unit and the weights of its respective various punctuation modes according to query requests. The method for building the linguistic model is not limited by the method and system for adding punctuation provided by the present disclosure.

Serving as an exemplary illustration, provided below is a preferred method for building a linguistic model based on speech segmentation and semantic features of terms and expressions. The method performs speech segmentation with respect to sentences in a body text of a spoken sentence, and obtains the linguistic model according to the association relationships between the semantic features and punctuation modes of each term or expression in the body text of the spoken sentence.

FIG. 3 is an exemplary first process flow diagram illustrating a method for building a linguistic model used for adding punctuations to a voice file, according to an embodiment of the present disclosure. As shown in FIG. 3, the first process flow includes:

In step 301: parsing out the various terms or expressions from the body text of a spoken sentence, wherein punctuations have already been added in advance to the spoken sentence according to the language library.

In step 302: searching the feature units according to the semantics feature of each parsed out term or expression and according to a preset feature template; and recording a number of occurrences of each punctuation mode in each feature unit in the text body of the spoken sentence, according to the punctuation mode that follows the term in the feature unit.

In step 303: determining a weight of each punctuation mode of each feature unit according to the number of occurrences of each punctuation mode of each feature unit; and building the linguistic model which comprises every feature unit and its respective punctuation mode with a corresponding weight relationship.

In step 302 of FIG. 3, a first method may be used: i.e. splitting or separating the semantic feature and punctuation modes of each term or expression in the body text of the spoken sentences in advance, searching feature units appearing in the body text according to a preset feature template, and recording the number of occurrences of each punctuation modes of each feature unit in the body text of the spoken sentence.

In step 302, a second method may also be used: i.e. in real-time identifying the semantic features of each term or expression in the spoken sentences and the punctuation modes after each term or expression, when searching feature units appearing in the body text according to a preset feature template. The second method as shown in FIG. 3 may be further described below in FIG. 4 in detail, in connection with the implementation of step 302, using method 1.

Figure 4:
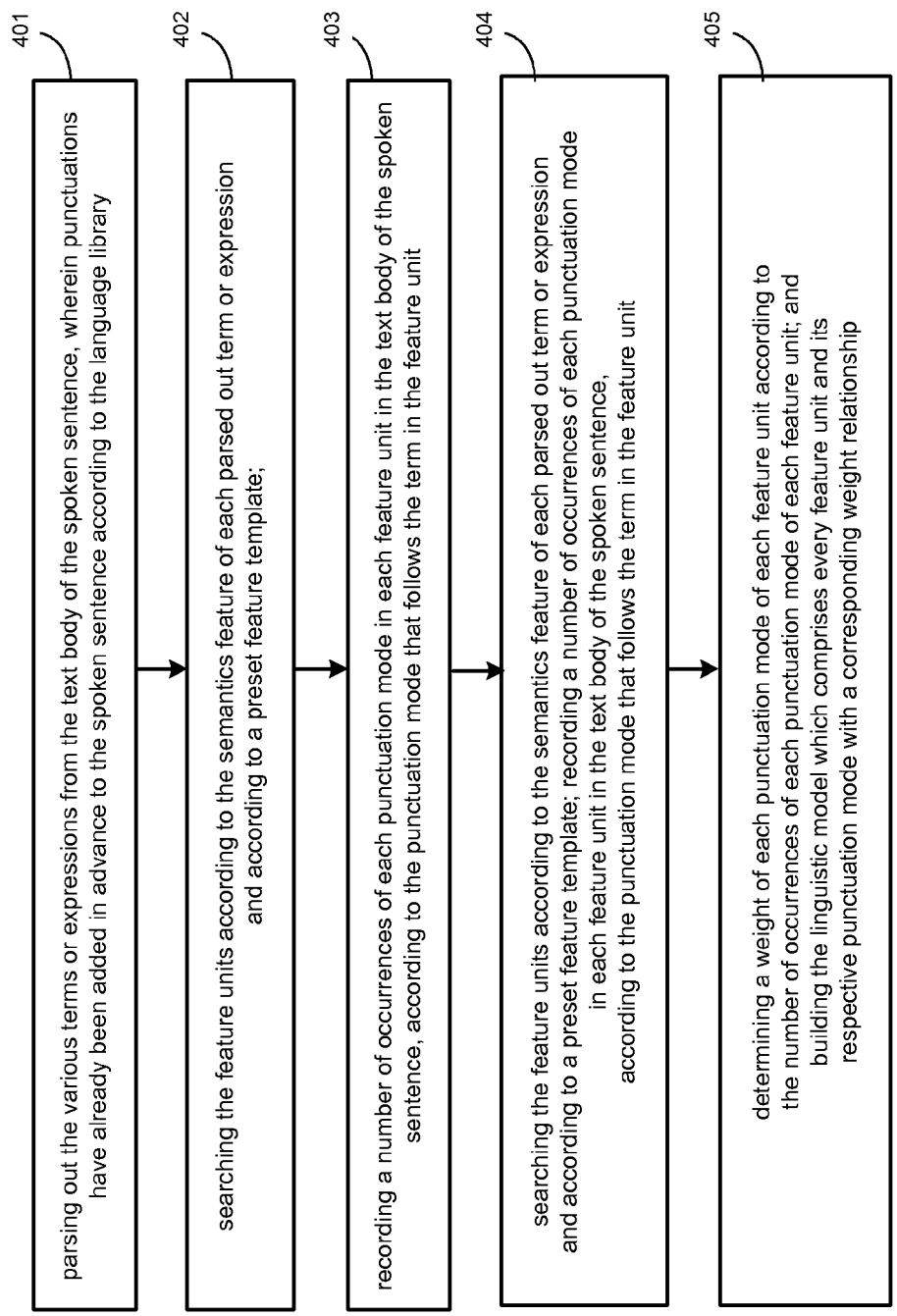
FIG. 4 is a second exemplary process flow diagram illustrating a method for building a linguistic model used for adding punctuations to a voice file, according to an embodiment of the present disclosure.

FIG. 4 is a second exemplary process flow diagram illustrating a method for building a linguistic model used for adding punctuations to a voice file, according to an embodiment of the present disclosure. As shown in FIG. 4, the method include:

In step 401: parsing out the various terms or expressions from the body text of the spoken sentence, wherein punctuations have already been added in advance to the spoken sentence according to the language library.

In step 402: searching the feature units according to the semantics feature of each parsed out term or expression and according to a preset feature template.

In step 403: recording a number of occurrences of each punctuation mode in each feature unit in the text body of the spoken sentence, according to the punctuation mode that follows the term or expression in the feature unit.

In step 404: searching the feature units according to the semantics feature of each parsed out term or expression and according to a preset feature template; and recording a number of occurrences of each punctuation mode in each feature unit in the text body of the spoken sentence, according to the punctuation mode that follows the term or expression in the feature unit.

In step 405: determining a weight of each punctuation mode of each feature unit according to the number of occurrences of each punctuation mode of each feature unit; and building the linguistic model which comprises every feature unit and its respective punctuation mode with a corresponding weight relationship.

Preferably, punctuations added in advance in the body text of spoken sentences should be highly accurate in order to improve the quality of the linguistic model built.

In the process flow of FIG. 4, steps 403 and step 404 may be implemented in a single process to extract a feature unit from the body text of a spoken sentence according to a preset feature template. If the feature unit extraction has not occurred, it may be equivalent to generation of a new feature unit, and a number of times the new feature unit being searched from the body text of the spoken sentence may be set to 1.

Based on the extraction of feature units according to the semantic features of terms or expressions in the spoken sentence, reference location information for a term or expression may be determined. The relative location information of the remaining terms or expressions within a speech segment or a spoken sentence may be determined based on an established current reference location. The feature unit extracted may include relative location information of the term or expression of its current location.

The preset feature template may include a quantity of acquired terms or expressions, the semantic features of the acquired terms or expressions, and the predetermined requirements to be fulfilled by the relative location relationships of the acquired terms or expressions with the current reference location. The extracting of the feature units from the spoken sentences according to a preset feature template may include: establishing the location of each term or expression parsed from the respective processed speech segments as the current reference location. Determining the location of the neighboring term or expression in the sentence, relative to the established current reference location that fulfills the feature template requirements. Generating a feature unit according to the semantic features of the terms or expressions, whose relative location to the current reference location may fulfill the feature template requirements. The feature unit may further include the relative location information of the term or expression in relation to the established current reference location.

Through the feature template containing relative location relationship requirements, a relationship may between neighboring terms or expressions may be determined. Accordingly, based on the feature units extracted by the feature template, punctuation modes may also be derived through the relationships information of the between neighboring terms or expressions. Therefore, the linguistic model built upon a relationship between the feature units a weight relation for each punctuation mode, would provide better accuracy in adding punctuations to the spoken sentence, and be able to accurately reflect the type of punctuation and where the punctuation should be added in the spoken sentence.

The preset feature templates may include: one or both of a single term or expression template and/or multi-term or expression template, depending on the number of terms or expression are acquired by the preset feature template.

The single term or expression template may perform functions of: acquiring the single term or expression whose current reference location in relation to its relative location fulfills a predetermined requirement, and the semantics features of the single term or expression, and the acquiring of the single term or expression feature unit which is based on the single term or expression feature template, including: taking a respective location of each term or expression as the current reference location, determining the single term or expression whose relative location relationship with the current reference location fulfills the requirements of the single term or expression feature template according to the single term or expression feature template; identifying the single term or expression feature unit according to the semantic features of the single term or expression, the single term or expression feature unit comprises the single term or expression, the semantic features of the single term or expression and the relative location relationship of the single term or expression with the current reference location.

When extracting feature units from a sentence according to the single term or expression template: take the respective location of each term or expression in the sentence as the current reference location, determine the single term or expression whose relative location relationship with the current reference location which fulfills the single term or expression feature template requirements according to the single term or expression feature template, determine the single term or expression feature unit occurring in the voice file to be processed according to the semantic features of the single term or expression, the single term or expression feature unit may include the single term or expression, the semantic features of the single term or expression, and the relative location relationship of the single term or expression and the current reference location.

The multi-term or expression template may perform functions including: acquiring multiple term or expression whose relative location relationship with the current reference location fulfills the predetermined requirements and the semantics features of each of the multiple terms or expressions.

The multi-term or expression feature units may also perform functions, including: acquiring the respective location of each term or expression as the current reference location, determining the multiple terms or expressions whose relative location relationship with the current reference location fulfills the requirements of the multi-term or expression feature template according to the multi-term or expression feature template; identifying multi-term or expression feature unit according to the semantic features of each of the multiple terms or expressions, the multi-term or expression feature unit may include the multiple terms or expressions the semantic features of the each of the multiple terms or expressions and the relative location relationship of each of the multiple terms or expressions with the current reference location.

When extracting feature units from a sentence according to the multi-term or expression template: take the respective location of each term or expression in the sentence as the current reference location, determine the multiple term or expression s whose relative location relationships with the current reference location meet the relative location relationship requirements of the multi-term or expression feature template according to the multi-term or expression feature template, determine the multi-term or expression feature unit appearing in the voice file to be processed according to the semantic features of each of the multiple term or expressions, the multi-term or expression feature unit including the multiple term or expressions, the semantic features of each of the multiple term or expressions, and the relative location relationship of each of the multiple term or expressions and the current reference location.

Wherein, different types of single term or expression templates may be acquired by modifying the relative location relationships with the reference location in the single term or expression template, e.g. for acquiring a single term or expression template of the term or expression at the current reference location and its semantic features (which may be marked as template T00), for acquiring a single term or expression template of the term or expression at the location preceding the current reference location and its semantic features (which may be marked as template T01), for acquiring a single term or expression template of the term or expression at the location, following the current reference location and its semantic features (which may be marked as template T02).

Different types of multi-term or expression templates may be acquired by modifying the relative location relationships with the reference location in the multi-term or expression template, e.g. for acquiring a multi-term or expression template of the term or expression is at the location preceding the current reference location, at the current reference location and at the location following the current reference location and their semantic features (which may be marked as T05), for acquiring a multi-term or expression template of the term or expression is at the two locations preceding the current reference location and at the current reference location and their semantic features (which may be marked as T06).

The more the number of term or expressions required by a multi-term or expression template, the stronger the association between the term or expression with higher accuracy for adding punctuations using the linguistic model built. The more the types of templates, the more comprehensive the consideration of the association relationships between the semantic features occurring in the sentence and the punctuation modes, and the higher accuracy for adding punctuation using the linguistic model built. Of course, the more the types of templates, the more the number of term or expressions are required by a multi-term or expression template, and the greater the computation workload would be required for building a linguistic model, the larger the linguistic model, and the greater the information processing workload for adding punctuation using the linguistic model built.

In step 405, determining a weight of each punctuation mode of each feature unit according to the number of occurrences of each punctuation mode of each feature unit; and building the linguistic model which comprises every feature unit and its respective punctuation mode with a corresponding weight relationship.

When determining the weight of each punctuation status of each feature unit according to the number of occurrences of each punctuation status of each feature unit, for easy operation, each feature unit may be given an ID, and the linguistic model built includes the feature unit ID, the feature unit corresponding to the ID, and the weight information of various punctuation statuses of the feature unit.

In the present disclosure, the semantic features of a term or expression may include but are not limited to "word attribute or property", and "composition" within the sentence. A same example used in the summary of invention discussion is provided below to illustrate the method for building a linguistic model as shown in FIG. 4.

The body text in the spoken sentence may read: "Today the weather is nice, this afternoon let's go to ball game, and afterwards let's go to dinner". When using the method as shown in FIG. 4 to build a linguistic model, the following steps need to be performed:

Step 1: performing speech segmentation with respect to the sentence. The term or expressions parsed or acquired, after performing the step of speech segmentation with respect to the sentence, may include: "today", "the weather", "is nice", "this afternoon", "let's go", "to a ballgame", "and afterwards", "dinner".

Step 2: marking the semantic features and punctuation status of each term or expression in the sentence for analysis, following the speech segmentation step. The results after analyzing the semantic features of the term or expression (i.e., "word attribute or property" and "composition" in the sentence) may be shown in Table 1.

The feature units acquired according to template T05 may include "today" and the semantic features of "today" (i.e. noun and adverbial modifier); "weather" and the semantic features of "weather" (i.e. noun and subject); and "nice" and the semantic features of "nice" (i.e. adjective and predicate).

The relative location information of each term or expression in the feature unit with respect to the current reference location may be stored in the feature unit in an explicit mode, and may also be stored in an implicit mode by assigning an ID within a corresponding range to the feature unit, according to the corresponding ID range of each template.

When extracting a feature unit according to the feature template, if there is no term or expression at a certain relative location required by the feature template, then an indication may be made with an agreement mode that there is no term or expression, e.g. using an agreed character or character

TABLE 1

| Term/Expression | Today | Weather | Nice | Let's | Afternoon | Go | Ballgame | Afterwards | Go | Dinner |
|---|---|---|---|---|---|---|---|---|---|---|
| Word Attribute/ Word Property | Noun | Noun | Adjective | Pronoun | Noun | Verb | Noun | Adverb | Verb | Noun |
| Composition in the sentence | Adverbial modifier | Subject | Predicate | Subject | Adverbial modifier | Predicate | Adverbial modifier | Adverbial modifier | Predicate | Object |
| Punctuation Mode | Nil | Nil | Comma | Nil | Nil | Nil | Comma | Nil | Nil | Full stop |

Step 3: extracting feature units according to the marking or analyzed results of step 2, and based on a preset feature template, assigning IDs to the extracted feature units, and recording the number of appearances or occurrences of each punctuation mode of the feature units, wherein the feature units may include the parsed term or expressions and the semantic features of the term or expressions.

In this step, it may be assumed that the preset feature templates include single term or expression templates T00, T01, T02 and multi-term or expression template T05. The single term or expression template T00 is used for acquiring the term or expression at the current reference location and its semantic features. The single term or expression template T01 is used for acquiring the term or expression at the location preceding the current reference location and its semantic features. The single term or expression template T02 is used for acquiring the term or expression at the location following the current reference location and its semantic features.

The multi-term or expression template T05 is used for acquiring the terms or expressions at the location preceding the current reference location, at the current reference location and at the location following the current reference location and their semantic features.

Take the location of each term or expression in the sentence after marking or analyzing in step 2 as the current reference location, extract feature units according to the single term or expression templates T00, T01, T02, and the multi-term or expression template T05.

For example, if the location of "weather" is taken as the current reference location, then the feature unit acquired according to template T00 may include "today" and the semantic features of "today" (i.e. noun and adverbial modifier). The feature unit acquired according to template T01 may include "weather" and the semantic features of "weather" (i.e. noun and subject). The feature unit acquired according to template T02 may include "nice" and the semantic features of "nice" (i.e. adjective and predicate).

string to show that there is no term or expression. For example, if there is no term or expression preceding "today" in the sentence, then the location of "today" may be taken as the current reference location, and when extracting feature units according to the templates T00 or T05, it may be required to use an agreement mode to indicate that there is no term or expression at the location preceding "today".

After extracting the feature units, assign different IDs to the feature units so as to differentiate feature units including different contents. There are numerous modes for ID assignment, e.g. a hash value generated according to the content of the feature unit may also be taken as the ID of the feature unit.

For each feature unit, each time when the feature unit occurs or appears in a body text of the sentence, the number of occurrences or appearances of the punctuation mode of the feature unit may be recorded according to the punctuation mode of each term or expression in the feature unit which appears currently. Wherein, the punctuation mode of the feature unit may include the punctuation mode of each term or expression in the feature unit; or in other term or expressions, when the feature unit contains multiple term or expressions. The punctuation mode of the feature unit is a combination of the punctuation modes of the multiple term or expressions.

When the punctuation mode of any term or expression changes, the punctuation mode of the feature unit containing multiple term or expressions also changes. For example, a feature unit includes three terms or expressions and the punctuation modes of the three terms or expressions may be "nil", "nil" and "comma" respectively, and the punctuation mode of the feature unit may be a combination of "nil", "nil" and "comma". When the punctuation mode of the third term or expression is changed to "nil", then the punctuation mode of the feature unit may also be changed to another punctuation mode, i.e. "nil", "nil" and "nil", respectively.

The advantages of the present disclosure using speech segmentation processing instead of non-speech segmentation processing may be seen from steps 2 and 3: only terms or expressions having explicit semantic features, and a single character usually does not have any explicit semantic feature. Therefore speech segmentation processing prepares the step 2. In addition, as contextual information contained in a sentence is often used during the process of feature extraction, and the parts immediately preceding and following a term or expression are also term or expressions, the relations of semantic features may be explicitly more reflected by an association relationships between terms or expressions, and the association between correlated semantic features and punctuation modes may be stronger.

Therefore, feature units extracted based on speech segmentation and the contextual association relationships after speech segmentation are capable of more extracting accurately the association relationships between the semantic information and punctuation modes contained in the sentence.

Step 4: determining the weight of each punctuation mode of each feature unit according to the feature units extracted in step 3, and the number of occurrences of each punctuation mode of the feature units, and building a linguistic model including corresponding relationships between each feature unit and the weights of its respective various punctuation modes. Wherein, the weight of each punctuation mode of each feature unit may be determined by an iterative optimization algorithm.

Wherein, a number of iterative optimization algorithms may be employed, e.g. Newton's iterative algorithm, BFGS (large-scale bound constrained optimization) iterative algorithm, L-BFGS (software for large-scale bound-constrained optimization) iterative algorithm, OWL-QN (Orthant-wise limited-memory quasi-Newton) iterative algorithm, etc. Preferably, L-BFGS iterative algorithm may be used as the algorithm, which has the advantages of higher iterative speed and capable of increasing the speed of building linguistic model.

Through steps 1 to 4, the linguistic model built ultimately includes corresponding relationships between each feature unit and the weights of its respective various punctuation modes, wherein each feature unit may also be provided with an ID different from those of other feature units, and the corresponding relationships between the feature unit and the weights of its respective various punctuation modes may be searched by the ID.

Accordingly, when acquiring the corresponding relationships between the feature unit and the weights of its respective various punctuation modes from the linguistic model, a query request having the ID of the feature unit may be sent to the linguistic model, and the corresponding relationships between the respective feature unit and the weights of its respective various punctuation statuses may be acquired from the linguistic model according to the ID of the feature unit, wherein the linguistic model stores the ID of the feature unit, the feature unit corresponding to the ID, and the corresponding relationships between the feature unit and the weights of its respective various punctuation statuses.

In the method for adding punctuation provided by the present disclosure, adding punctuation may be based on the linguistic model including the single term or expression feature unit and/or the multi-term or expression feature unit: taking the respective location of each term or expression as the current reference location, determine a single term or expression whose relative location relationship with the current reference location fulfills or meets the requirements of the single term or expression feature template according to the single term or expression feature template, and identify single term or expression feature unit according to the semantic features of the single term or expression.

The single term or expression feature template may include acquiring a single term or expression whose relative location relationship with the current reference location fulfills or meets the predetermined requirements and the semantic features of the single term or expression. The single term or expression feature unit may include the single term or expression, the semantic features of the single term or expression and the relative location relationship of the single term or expression with the current reference location; and/or, taking the respective location of each term or expression as the current reference location, determining multiple terms or expressions whose relative location relationships with the current reference location meet the requirements of the multi-term or expression feature template according to the multi-term or expression feature template, identifying multi-term or expression feature unit according to the semantic features of each of the multiple term or expressions, wherein the multi-term or expression feature template includes acquiring multiple term or expressions whose relative location relationships with the current reference location meet the predetermined requirement.

The semantic features of each of the multiple terms or expressions, the multi-term or expression feature unit may include the multiple terms or expressions, the semantic features of the each of the multiple terms or expressions and the relative location relationship of each of the multiple terms or expressions with the current reference location.

In the system for adding punctuation provided by the present disclosure, when adding punctuation based on the linguistic model including the single term or expression feature unit and/or the multi-term or expression feature unit, the identification module (202) may be used for taking the respective location of each term or expression as the current reference location, determine a single term or expression whose relative location relationship with the current reference location meets the requirements of the single term or expression feature template according to the single term or expression feature template, and identify single term or expression feature unit according to the semantic features of the single term or expression.

The single term or expression feature template includes acquiring a single term or expression whose relative location relationship with the current reference location meets the predetermined requirements and the semantic features of the single term or expression. The single term or expression feature unit may include the single term or expression, the semantic features of the single term or expression and the relative location relationship of the single term or expression with the current reference location; and/or, the identification module (202) may be used for taking the respective location of each term or expression as the current reference location, determining multiple term or expressions whose relative location relationships with the current reference location meet the requirements of the multi-term or expression feature template according to the multi-term or expression feature template, identifying multi-term or expression feature unit according to the semantic features of each of the multiple terms or expressions.

The multi-term or expression feature template includes acquiring multiple term or expressions whose relative location relationships with the current reference location meet the predetermined requirements and the semantic features of each of the multiple term or expressions. The multi-term or expression feature unit may include the multiple term or expressions, the semantic features of the each of the multiple terms or expressions and the relative location relationship of each of the multiple terms or expressions with the current reference location.

Serving as an exemplary illustration, a specific process flow may be provided below for a further detailed and intuitive illustration of a method and/or system for adding punctuation of the present disclosure, based on a linguistic model provided by the present disclosure. See FIG. 5 for details.

Figure 5:
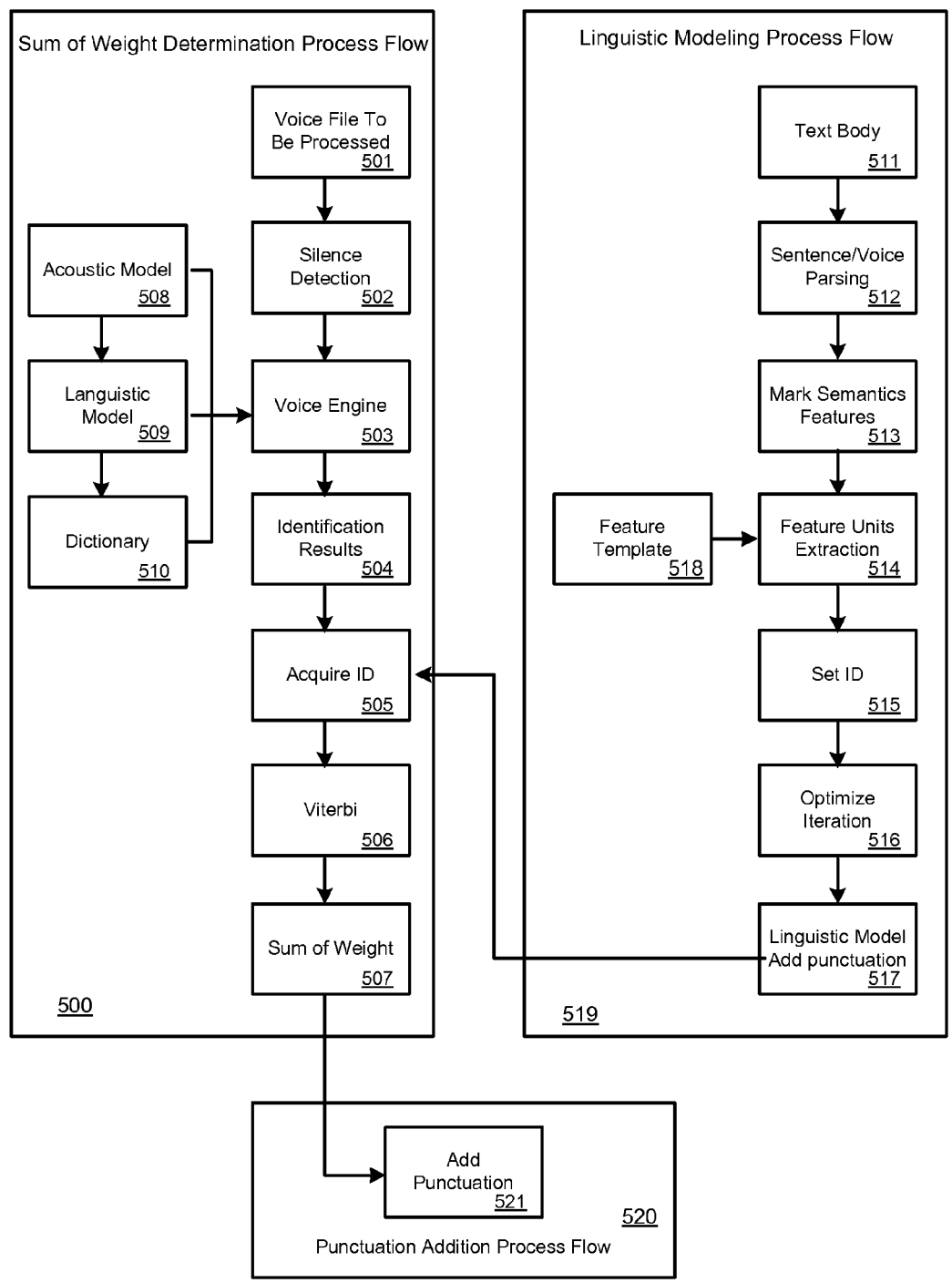
FIG. 5 is an exemplary process flow diagram for adding punctuations to a voice file based on the linguistic model, the method and system according to an embodiment of the present disclosure.

FIG. 5 is an exemplary process flow diagram for adding punctuations to a voice file based on the linguistic model, the method and system according to an embodiment of the present disclosure.

As shown in FIG. 5, the process flow includes the following sub-processes: linguistic modeling process flow, integrated weight determination process flow, and punctuation addition process flow. Wherein, the linguistic modeling process flow is a pre-processing process flow. Once a linguistic model is built, the linguistic model may be used directly for adding punctuations.

Specifically, in the linguistic modeling process flow (519), first perform speech segmentation and sentence segmentation (512) with respect to a body text (511) of the spoken sentence. Separate and analyze the semantic features (513) of each term or expression in the body text of the spoken sentence. Perform feature extraction (514) based on a preset feature template (518) and according to the term or expression segmentation results of the body text to extract feature units (514). Identify the number of occurrences of each punctuation status of each feature unit. Assign ID to each feature unit, acquire the corresponding relationships of each feature unit and its respective various punctuation modes through iterative optimization and thereby obtain a linguistic model for adding punctuation (517), wherein corresponding relationships between each feature unit and the weights of its respective various punctuation statuses are stored in the linguistic model (509).

In a sum of weight determination process flow (510), the voice file to be processed (501) is input in its entirety as a whole paragraph to the silence or pause duration detection module (502). The silence or pause detection module marks off the speech segments to be processed from the voice file to be processed according to silence or a pause duration detection results; sends the speech segments to be processed one by one to a voice engine (503). The voice identification engine (504) identifies the terms or expressions contained in each speech segment and the semantic features thereof according to an acoustic model (508).

A dictionary (510) and a linguistic model (509) identifies the semantic features of sentences; performs feature unit identification according to the term or expressions contained in each speech segment and the semantic features to identity the feature units contained in each speech segments; determines the gathered or union of sets of feature units of all speech segments contained in the voice file to be processed as all feature units contained in the voice file; acquires the weight of each punctuation status of each feature unit from the linguistic model built in the linguistic modeling process flow according to the ID of each of the feature units. Finally computes the optimal path using Viterbi algorithm (506) and thereby obtains the sum of weight (507) of the various punctuation modes of the voice file to be processed.

In the punctuation addition process flow (520), add punctuation (521) to the voice file to be processed according to the sum of weight (507) of various punctuation modes of the voice file to be processed, e.g. the punctuation mode corresponding to the maximum sum of weight may be selected. The punctuation may be added to the voice file to be processed according to the selected punctuation mode.

Disclosed above are only the preferred embodiments of the present disclosure and these preferred embodiments are not intended to limit the scope of the present disclosure. Hence any variations, modifications or replacements made without departing from the spirit of the present disclosure shall fall within the scope of the present disclosure.

In addition, the present disclosure also provides a non-transitory computer-readable storage medium with computer-executable commands stored within. For example, the invention may be implemented as an algorithm as codes stored in a program module or a system with multi-program-modules. The computer-readable storage medium may be, for example, nonvolatile memory such as compact disc, hard drive or flash memory. The computer-executable commands are used to enable a computer or similar computing device to accomplish the punctuations adding to the voice file operations.

What is claimed is:

1. An improved method for adding punctuations to a voice file, comprising:

executing by a processor, program codes stored in a memory to configure a computing device to add punctuations to a voice file, comprising performing the following steps:

utilizing silence or pause duration detection to divide the voice file into a plurality of speech segments for processing, wherein respective speech segments form respective sentences within the voice file, and each respective sentence of the voice file comprising a plurality of features units, wherein each feature unit comprises a single term or multi-terms expression having semantic features corresponding to the single term or multi-terms expression;

identifying the plurality of features units that appear in the voice file according to every term or expression, and according to the semantic features corresponding to the every single term or multi-terms expression that form each of the plurality of speech segments, the semantic features comprising a word attribute and a composition within each respective sentence and wherein identifying the plurality of feature units is based on taking the respective location of each term as the current reference location, determine a single term whose relative location relationship with the current reference location comprises the semantic features of the single term feature or expression template according to the single term feature template and further continuing the identifying for multi-terms expression comprising the term based on each of the identified feature units;

assigning a corresponding weight to each punctuation mode which is associated to the single term or multi-terms expression in each respective identified feature unit, wherein a punctuation mode being either no punctuation used or a particular punctuation being used in the single term or multi-terms expression;

using a linguistic model to determine a maximum sum of weight as ultimate punctuation modes for the respective speech segments which form the respective sentences within the voice file, wherein a sum of weight is determined by summing all corresponding weights on occurrences of each of various possible punctuation modes in the voice file and according to all the respective identified feature units, wherein the linguistic model is built upon the semantic features of parsed out various single terms or multi-terms expressions from a body text of a spoken sentence according to a language library;

adding respective punctuations to form respective punctuated sentences within the voice file based on the determined maximum sum of weight of the various punctuation modes; and transcribing the voice file with the added respective punctuations to output the punctuated sentences as text.

2. The method according to claim 1, wherein the silence or pause detection comprises:

determining a silence or pause duration threshold according to a current application scenario;

detecting the silence or pause duration in the voice file to be processed, and when the silence or pause duration is longer than the silence threshold:

separating the speech segments in the voice file at locations that correspond to the silence or pause duration.

3. The method according to claim 1, wherein the identifying of the plurality of features units that appears in the voice file, comprising:

gathering into a set, the respective identified feature units that appear in the plurality of speech segments.

4. The method according to claim 1, wherein the building of the linguistic model comprises:

parsing out the various single terms or multi-terms expressions from the body text of the spoken sentence, wherein punctuations have already been added in advance to the spoken sentence according to the language library;

searching the respective identified feature unit according to the semantic features of each parsed out single term or multi-terms expression, and according to a preset feature template;

recording a number of occurrences of each punctuation mode in each respective identified feature unit in the body text of the spoken sentence, according to the punctuation mode that follows the single term or multi-terms expression in the respective identified feature unit;

determining a corresponding weight of each punctuation mode of each respective identified feature unit according to the number of occurrences of each punctuation mode of each respective identified feature unit; and building the linguistic model which comprises every respective identified feature unit and its respective punctuation mode with a corresponding weight relationship.

5. The method according to claim 1, wherein the single term feature unit is acquired according to a single term feature template, and the multi-term expression feature unit is acquired according to a multi-term expression feature template;

the single term or multi-terms expression feature template perform functions, comprising: acquiring the single term or multi-terms expression whose current reference location in relation to its relative location fulfills a predetermined requirement, and the semantic features of the single term or multi-terms expression, and the acquiring of the single term feature unit which is based on the single term feature template, comprising:

taking a respective location of each single term as the current reference location, determining the single term whose relative location relationship with the current reference location fulfills the requirements of the single term feature template according to the single term feature template;

identifying the single term feature unit according to the semantic features of the single term, the single term feature unit comprises the single term, the semantic features of the single term and the relative location relationship of the single term with the current reference location; and the multi-terms expression feature template includes acquiring the multi-terms expression whose relative location relationship with the current reference location fulfills the predetermined requirements and the semantics features of each of the multi-terms expression, and the multi-terms expression feature units perform functions, comprising:

acquiring the respective location of each multi-terms expression as the current reference location, determining the multi-terms expression whose relative location relationship with the current reference location fulfills the requirements of the multi-terms expression feature template according to the multi-terms expression feature template;

identifying the multi-terms expression feature unit according to the semantic features of each multi-terms expression, the multi-term expression feature unit comprises the multi-terms expression the semantic features of the multi-terms expression and the relative location relationship of the multi-terms expression with the current reference location.

6. The method according to claim 1, wherein the determining of the maximum sum of weight on each of the various possible punctuation modes in the voice file and according to all the respective identified feature units, comprises:

acquiring from the linguistic model corresponding relationships between each respective identified feature unit among all the respective identified feature units and the corresponding weights of the respective various possible punctuation modes;

determining the corresponding weight of the punctuation mode of each single term or multi-terms expression in the voice file to be processed according to the acquired corresponding relationships, and determining the maximum sum of weight of the various possible punctuation modes of the voice file to be processed according to the corresponding weight of the punctuation mode of each single term or multi-terms expression.

7. A system for adding punctuations to a voice file, comprises at least a processor which executes program codes stored in a memory to configure a computing device to add punctuations to a voice file, wherein the computing device is configured to:

divide the voice file into a plurality of speech segments to be processed based on silence or pause detection for processing, wherein respective speech segments form respective sentences within the voice file, and each respective sentence of the voice file comprising a plurality of features units, wherein each feature unit comprises a single term or multi-terms expression having semantic features corresponding to the single term or multi-terms expression;

identify the plurality of features units that appear in the voice file according to every term or expression, and according to the semantic features corresponding to the every single term or multi-terms expression that form each of the plurality of speech segments, the semantic features comprising a word attribute and a composition within each respective sentence and wherein identifying the plurality of feature units is based on taking the respective location of each term as the current reference location, determine a single term whose relative location relationship with the current reference location comprises the semantic features of the single term feature or expression template according to the single term feature template and further continuing the identifying for multi-terms expression comprising the term based on each of the identified feature units;

assign a corresponding weight to each punctuation mode which is associated to the single term or multi-terms expression in each respective identified feature unit, wherein a punctuation mode being either no punctuation used or a particular punctuation being used in the single term or multi-terms expression;

use a linguistic model to determine a maximum sum of weight as ultimate punctuation modes for the respective speech segments which form the respective sentences within the voice file, wherein a sum of weight is determined by summing all corresponding weights on occurrences of each of various possible punctuation modes in the voice file and according to all the respective identified feature units, wherein the linguistic model is built upon the semantic features of parsed out various single terms and multi-terms expressions from a body text of a spoken sentence according to a language library;

add respective punctuations to form respective punctuated sentences within the voice file based on the determined maximum sum of weight of the various punctuation modes; and transcribe the voice file with the added respective punctuations to output the punctuated sentences as text.

8. The system according to claim 7, wherein:
the computing device is further configured to:
determine the silence or pause duration threshold according to a current application scenario;
detect the silence or pause duration in the voice file to be processed, and when the silence duration is longer than the silence threshold: and
separate the voice segments to be processed in the voice file at locations that correspond to the silence or pause duration.

9. The system according to claim 7, wherein:
the computing device is further configured to:
gather into a set, the feature units that appear in the plurality of speech segments.

10. The system according to claim 7, wherein the computing device is further configured to utilize a linguistic model which is built through performing the following steps by the processor:
parsing out the various single terms or multi-terms expressions from the body text of the spoken sentence, wherein punctuations have already been added in advance to the spoken sentence according to the language library;
searching the respective identified feature unit according to the semantic features of each parsed out single term or multi-terms expression, and according to a preset feature template;
recording a number of occurrences of each punctuation mode in each respective identified feature unit in the body text of the spoken sentence, according to the punctuation mode that follows the single term or multi-terms expression in the respective identified feature unit;
determining a corresponding weight of each punctuation mode of each respective identified feature unit according to the number of occurrences of each punctuation mode of each feature unit; and
building the linguistic model which comprises every respective identified feature unit and its respective punctuation mode with a corresponding weight relationship.

11. The system according to claim 7, wherein
the computing device is further configured to:
take a respective location of each single term as the current reference location, determining the single term whose relative location relationship with the current reference location fulfills the requirements of the single term feature template according to the single term feature template;
identify the single term feature unit according to the semantic features of the single term, the single term feature unit comprises the single term, the semantic features of the single term and the relative location relationship of the single term with the current reference location.

12. The system according to claim 7, wherein the computing device is further configured to:
acquire from the linguistic model corresponding relationships between each respective identified feature unit among all the respective identified feature units and the corresponding weights of the respective various possible punctuation modes;
determine the corresponding weight of the punctuation mode of each single term or multi-terms expression in the voice file to be processed according to the acquired corresponding relationships, and determining the maximum sum of weight of the various possible punctuation modes of the voice file to be processed according to the corresponding weight of the punctuation mode of each single term or multi-terms expression.

13. A non-transitory computer-readable medium having stored thereon, a computer program having at least one code section being executable by a machine for causing the machine to add punctuations to a voice file by performing steps comprising:
utilizing silence or pause duration detection to divide the voice file into a plurality of speech segments for processing, wherein respective speech segments form respective sentences within the voice file, and each respective sentence of the voice file comprising a plurality of features units, wherein each feature unit comprises a single term or multi-terms expression having semantic features corresponding to the single term or multi-terms expression;
identifying the plurality of features units that appear in the voice file according to every term or expression, and according to the semantic features corresponding to the every single term or multi-terms expression that form each of the plurality of speech segments, the semantic features comprising a word attribute and a composition within each respective sentence and wherein identifying the plurality of feature units is based on taking the respective location of each term as the current reference location, determine a single term whose relative location relationship with the current reference location comprises the semantic features of the single term feature or expression template according to the single term feature template and further continuing the identifying for multi-terms expression comprising the term based on each of the identified feature units;

assigning a corresponding weight to each punctuation mode which is associated to the single term or multi-terms expression in each respective identified feature unit, wherein a punctuation mode being either no punctuation used or a particular punctuation being used in the single term or multi-terms expression;

using a linguistic model to determine a maximum sum of weight as ultimate punctuation modes for the respective speech segments which form the respective sentences within the voice file, wherein a sum of weight is determined by summing all corresponding weights on occurrences of each of various possible punctuation modes in the voice file and according to all the respective identified feature units, wherein the linguistic model is built upon the semantic features of parsed out various single terms and multi-terms expressions from a body text of a spoken sentence according to a language library;

adding respective punctuations to form respective punctuated sentences within the voice file based on the determined maximum sum of weight of the various punctuation modes; and transcribing the voice file with the added respective punctuations to output the punctuated sentences as text.

14. The non-transitory computer-readable medium according to claim 13, wherein the silence or pause detection comprises:

determining a silence or pause duration threshold according to a current application scenario;

detecting the silence or pause duration in the voice file to be processed, and when the silence or pause duration is longer than the silence threshold:

separating the speech segments in the voice file at locations that correspond to the silence or pause duration.

15. The non-transitory computer-readable medium according to claim 13, wherein the identifying of the plurality of features units that appears in the voice file, comprises:

gathering into a set, the respective identified feature units that appear in the plurality of speech segments.

16. The non-transitory computer-readable medium according to claim 13, wherein the building of the linguistic model comprises:

parsing out the various single terms or multi-terms expressions from the body text of the spoken sentence, wherein punctuations have already been added in advance to the spoken sentence according to the language library;

searching the respective identified feature unit according to the semantic features of each parsed out single term or multi-terms expression, and according to a preset feature template;

recording a number of occurrences of each punctuation mode in each respective identified feature unit in the body text of the spoken sentence, according to the punctuation mode that follows the single term or multi-terms expression in the respective identified feature unit;

determining a corresponding weight of each punctuation mode of each respective identified feature unit according to the number of occurrences of each punctuation mode of each respective identified feature unit; and building the linguistic model which comprises every respective identified feature unit and its respective punctuation mode with a corresponding weight relationship.

17. The non-transitory computer-readable medium according to claim 13, wherein the single term feature unit is acquired according to a single term feature template, and the multi-term expression feature unit is acquired according to a multi-term expression feature template;

the single term or multi-terms expression feature template perform functions, comprising: acquiring the single term or multi-terms expression whose current reference location in relation to its relative location fulfills a predetermined requirement, and the semantic features of the single term or multi-terms expression, and the acquiring of the single term feature unit which is based on the single term feature template, comprising:

taking a respective location of each single term as the current reference location, determining the single term whose relative location relationship with the current reference location fulfills the requirements of the single term feature template according to the single term feature template;

identifying the single term feature unit according to the semantic features of the single term, the single term feature unit comprises the single term, the semantic features of the single term and the relative location relationship of the single term with the current reference location; and the multi-terms expression feature template includes acquiring the multi-terms expression whose relative location relationship with the current reference location fulfills the predetermined requirements and the semantics features of each of the multi-terms expression, and the multi-terms expression feature units perform functions, comprising:

acquiring the respective location of each multi-terms expression as the current reference location, determining the multi-terms expression whose relative location relationship with the current reference location fulfills the requirements of the multi-terms expression feature template according to the multi-terms expression feature template;

identifying the multi-terms expression feature unit according to the semantic features of each multi-terms expression, the multi-term expression feature unit comprises the multi-terms expression the semantic features of the multi-terms expression and the relative location relationship of the multi-terms expression with the current reference location.

18. The non-transitory computer-readable medium according to claim 13, wherein the determining of the maximum sum of weight on each of the various possible punctuation modes in the voice file and according to all the respective identified feature units, comprises:

acquiring from the linguistic model corresponding relationships between each respective identified feature unit among all the respective identified feature units and the corresponding weights of the respective various possible punctuation modes;

determining the corresponding weight of the punctuation mode of each single term or multi-terms expression in the voice file to be processed according to the acquired corresponding relationships, and determining the maximum sum of weight of the various possible punctuation modes of the voice file to be processed according to the corresponding weight of the punctuation mode of each single term or multi-terms expression.

* * * * *